United States Patent
Hiyoshi et al.

(10) Patent No.: US 9,476,354 B2
(45) Date of Patent: Oct. 25, 2016

(54) DRIVE APPARATUS CONSTRUCTED TO DETECT RATCHETING IN WAVE MOTION GEARING SPEED REDUCER

(71) Applicant: NISSAN MOTOR CO., LTD., Yokohama-shi, Kanagawa (JP)

(72) Inventors: Ryosuke Hiyoshi, Atsugi (JP); Shinobu Kamada, Kawasaki (JP); Sho Ohtsu, Zama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/443,853

(22) PCT Filed: Dec. 16, 2013

(86) PCT No.: PCT/JP2013/083615
§ 371 (c)(1),
(2) Date: May 19, 2015

(87) PCT Pub. No.: WO2014/109179
PCT Pub. Date: Jul. 17, 2014

(65) Prior Publication Data
US 2015/0292400 A1    Oct. 15, 2015

(30) Foreign Application Priority Data

Jan. 9, 2013  (JP) .................................. 2013-001475

(51) Int. Cl.
*F02B 75/04* (2006.01)
*F16H 49/00* (2006.01)
*F16H 57/01* (2012.01)

(52) U.S. Cl.
CPC ............. *F02B 75/04* (2013.01); *F02B 75/045* (2013.01); *F16H 49/001* (2013.01); *F16H 57/01* (2013.01); *F16H 2057/012* (2013.01); *F16H 2057/016* (2013.01); *F16H 2057/018* (2013.01)

(58) Field of Classification Search
CPC .................. F02D 15/00; F02D 15/02; F02B 75/04–75/048; F16H 49/001; F16H 2059/465; F16H 57/01; F16H 2057/012–2057/018
USPC ........... 123/48 B, 48 R, 78 BA, 78 E, 197.3, 123/197.4
See application file for complete search history.

(56) References Cited

U.S. PATENT DOCUMENTS 7,360,513 B2 *   4/2008   Takemura ............. F02B 75/048
                                                          123/48 B (Continued)

FOREIGN PATENT DOCUMENTS

| DE | 10 2007 032569 A1 | 1/2008 |
|---|---|---|
| JP | H01-143448 U | 10/1989 |
| JP | 10-58374 | 3/1998 |
| JP | 2006-347406 A | 12/2006 |
| JP | 2007-154955 A | 6/2007 |

(Continued)

*Primary Examiner* — Lindsay Low
*Assistant Examiner* — Robert Werner
(74) *Attorney, Agent, or Firm* — Drinker Biddle & Reath LLP

(57) ABSTRACT

A wave motion gearing speed reducer (20) is disposed between a driving motor (15) and a control shaft (11) of a variable compression ratio mechanism. There are provided a input shaft rotation sensing sensor (31) to sense the rotational position of an input shaft (16) of the speed reducer (20), and an output shaft rotation sensing sensor (32) to sense the rotational position of an output shaft (12) of the speed reducer (20). When a discrepancy quantity (Δε) between sensed quantities of both sensors is greater than or equal to a predetermined value, a judgment is made that a ratcheting of slippage of an engaging position between internal teeth (22) and external teeth (25) is generated.

15 Claims, 5 Drawing Sheets

(56) References Cited

U.S. PATENT DOCUMENTS

| | | | |
|---|---|---|---|
| 7,477,033 B2 * | 1/2009 | Abe | G03G 15/5008 318/433 |
| 7,871,083 B2 | 1/2011 | Urababa et al. | |
| 8,281,688 B2 * | 10/2012 | Kobayashi | F16H 35/10 192/56.1 |
| 2008/0011253 A1 | 1/2008 | Nakamura | |
| 2009/0091093 A1 * | 4/2009 | Urababa | B60G 17/0162 280/5.511 |

FOREIGN PATENT DOCUMENTS

| | | |
|---|---|---|
| JP | 2007-203799 A | 8/2007 |
| JP | 2010151088 A * | 7/2010 |
| JP | 2011-169152 | 9/2011 |
| JP | 2011-169152 A | 9/2011 |
| JP | 2012-122509 A | 6/2012 |
| JP | 2012-251446 A | 12/2012 |
| WO | WO 95/00748 A1 | 1/1995 |
| WO | WO 2014/098008 A1 | 6/2014 |

* cited by examiner

DRIVE APPARATUS CONSTRUCTED TO DETECT RATCHETING IN WAVE MOTION GEARING SPEED REDUCER

TECHNICAL FIELD

The present invention relates to a drive apparatus or device having a wave motion gearing type speed reducer.

BACKGROUND ART

As disclosed in Patent Document 1, a drive apparatus for driving a driven unit such as a variable compression ratio mechanism, with a driving unit such as a motor, employs a wave motion gearing or strain wave gearing type speed reducer providing a greater reduction ratio, in order to reduce the size and output power of the driving unit and to improve the controllability.

This speed reducer or reduction gear includes a rigid gear of rigid body having internal teeth formed in an inside circumference, a wave generator disposed coaxially inside the rigid gear, and a flexible gear which is disposed coaxially between the wave generator and the rigid gear, which is deformed elastically by the wave generator into an elliptical shape, and which has external teeth formed in an outside circumference of the flexible gear and arranged to engage with the above-mentioned internal teeth at two positions in the direction of the major axis of the elliptical shape. In this structure, the rigid gear and flexible gear are arranged to rotate relative to each other by a rotational or angular amount corresponding to a teeth number difference between the internal teeth and external teeth, with respect to one revolution of the wave generator.

PRIOR ART DOCUMENT(S)

Patent Document(s)

Patent Document 1: JP2011-169152A

SUMMARY OF THE INVENTION

Problem to be Solved by the Invention

The thus-constructed wave motion gearing speed reducer is small in size, light in weight and capable of providing a greater reduction ratio. On the other hand, the wave motion gearing speed reducer might be subjected to a so-called ratcheting denoting slippage or shift of the engaging position or positions between the internal and external teeth of the speed reducer when an excessive torque exceeding the allowable load torque is applied. Therefore, in the case of a construction to sense the rotational or angular position of an input shaft connected with the driving unit in order to control the driving condition of the driving unit such as a motor, for example, the system is unable to detect the ratcheting if generated, and therefore the sensed quantity or sensed value deviates from the actual driving position (actual compression ratio).

Means for Solving the Problem

The present invention has been devised in view of such a situation, and its object is to provide a novel drive apparatus or system capable of judging or detecting occurrence of ratcheting in a wave motion gearing speed reducer accurately.

A drive apparatus or system according to the present invention comprises a driving section; a driven section driven by the driving section; and a speed reducer disposed between the driving section and the driven section and arranged to transmit rotation at a reduced speed from an input shaft connected with the driving section to an output shaft connected with the driven section. The speed reducer is a wave motion gearing speed reducer including a rigid gear of rigid body including an inside circumference formed with internal teeth, a wave generator disposed coaxially in the rigid gear, and a flexible gear which is disposed coaxially between the wave generator and the rigid gear, which is arranged to be deflected elastically into an elliptical shape by the wave generator, and which includes an outside circumference formed with external teeth engaging with the internal teeth at two engaging positions in a direction of a major axis of the elliptical shape. The rigid gear and the flexible gear are arranged to rotate relative to each other by an amount corresponding to a teeth number difference which is a difference between the numbers of the internal teeth and the external teeth when the wave generator is rotated one revolution.

Furthermore, according to the present invention, there are provided an input shaft rotation sensing section to sense a rotational or angular position of the input shaft of the speed reducer, and an output shaft rotation sensing section to sense a rotational or angular position of the output shaft of the speed reducer. The drive apparatus or system is configured to judge occurrence of a ratcheting that is slipping of engaging position or engaging positions of the internal teeth and the external teeth when a discrepancy or difference between a sensed quantity or sensed value of the input shaft rotation sensing section and a sensed quantity or sensed value of the output shaft rotation sensing section is greater than or equal to a predetermined value.

Effect of the Invention

According to the present invention, the apparatus can accurately judge or detect occurrence of a ratcheting by using the sensed quantity of the input shaft rotation sensing section and the sensed quantity of the output shaft rotation sensing section. Therefore, the apparatus can properly meet the problems, such as a decrease of the controllability, caused by the ratcheting.

MODE(S) FOR CARRYING OUT THE INVENTION

Figure 1:
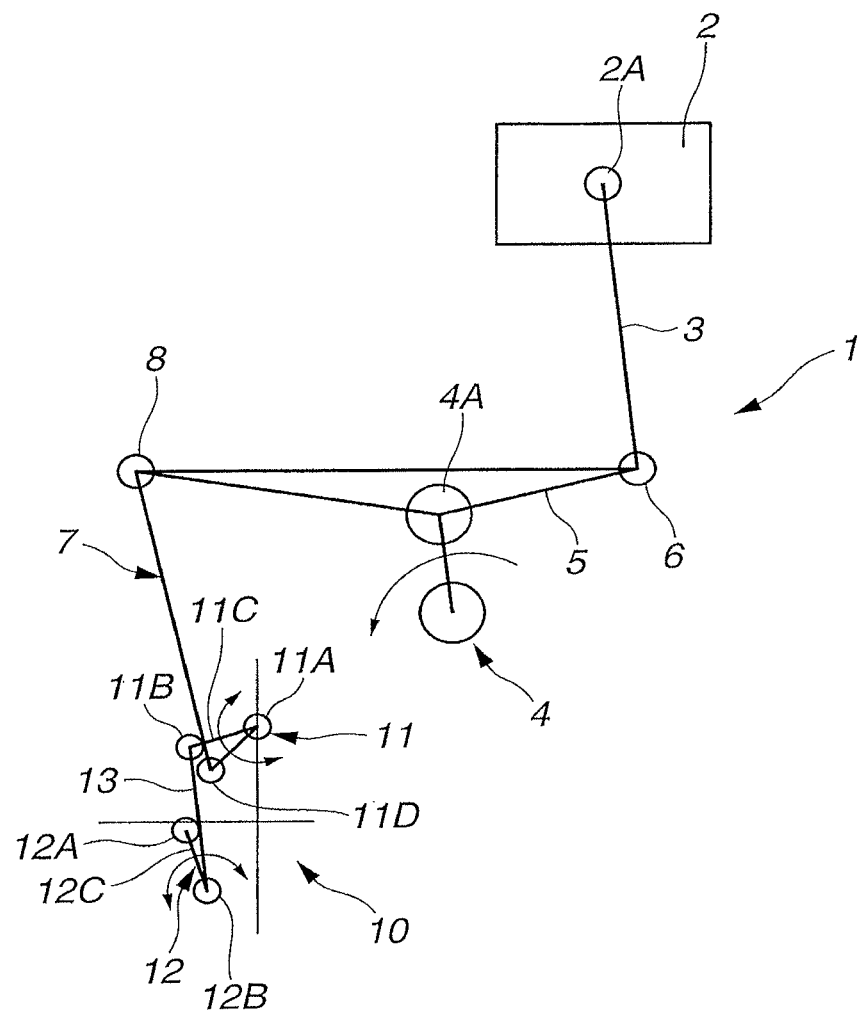
FIG. 1 is a construction view schematically showing a variable compression ratio mechanism as a driven section according to one embodiment of the present invention.

Hereinafter, the present invention is explained by using embodiment(s) illustrated in the drawings. FIG. 1 shows a variable compression ratio mechanism or compression ratio varying mechanism 1 as a driven section of a drive apparatus. This variable compression ratio mechanism 1 is known per se as disclosed in JP 2011-169152. Therefore, the following explanation is simplified.

This variable compression ratio mechanism 1 includes an upper link 3 and a lower link 5 attached rotatably to a crank pin 4A of a crank shaft 4. An upper end of upper link 3 is attached rotatably through a piston pin 2A, to a piston 2 movable up and down in a cylinder of a cylinder block. Lower link 5 is connected rotatably through a connection pin 6 with a lower end of upper link 3, and further connected rotatably through a control pin 8 with an upper end portion of a control link 7.

Figure 2:
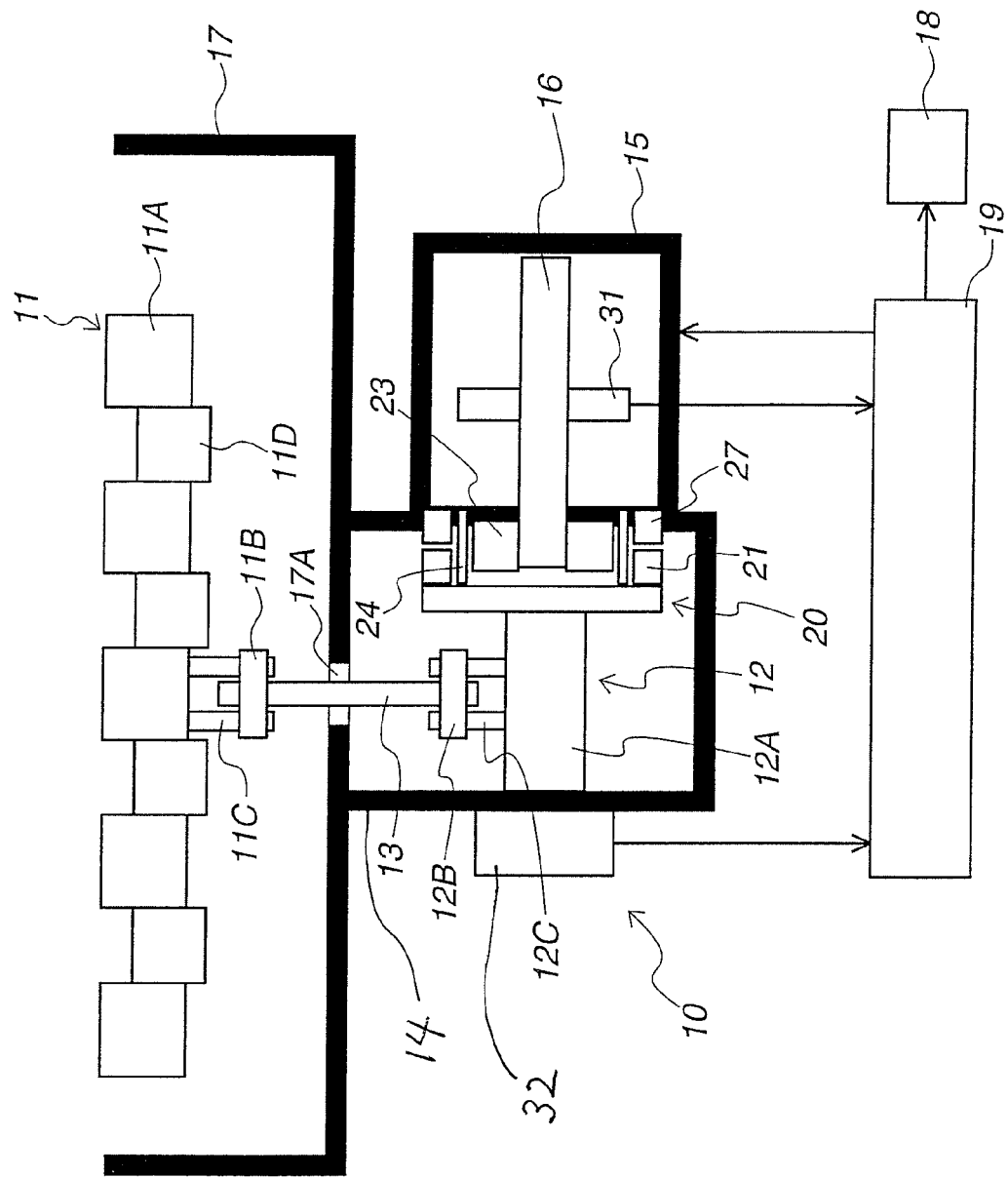
FIG. 2 is a sectional correspondence view showing a connecting structure between a control shaft of the variable compression ratio mechanism and a driving motor.

As shown in FIGS. 1 and 2, a driving motor 15 (cf. FIG. 2) as a driving section is arranged to shift a rotational position of a control shaft 11 through a connecting mechanism 10 and thereby to shift the position of a lower end of the control link 7. This shift of the position of the lower end of control link 7 causes a variation of the attitude of lower link 5 and varies the compression ratio of an engine continuously. The connecting mechanism 10 connecting the lower end of control link 7 and the driving motor 15 includes the control shaft 11, an auxiliary control shaft 12, and a connecting link 13 connecting the shafts 11 and 12.

Control shaft 11 extends in parallel to the crank shaft 4, in the direction of the cylinder row, inside the engine. Control shaft 11 includes first journal portion or portions 11A rotatably supported by an engine main body member such as the cylinder block, and a plurality of control eccentric shaft portions 11D. The lower end of control link 7 of each cylinder is attached rotatably to one of the control eccentric shaft portions 11D. The control eccentric shaft portions 11D are formed at an eccentric position eccentric by a predetermined amount with respect to first journal portion 11A. Moreover, a forward end of a first arm portion 11C extending radially from the first journal portion 11A is connected rotatably with one end of the connecting link 13 by a first connection pin 11B.

Auxiliary control shaft 12 includes a second journal portion 12A supported rotatably by a housing 14 (cf. FIG. 2), and a second arm portion 12C extending radially from second journal portion 12A. A forward end of the second arm portion 12C is connected rotatably with the other end of connecting link 13 by a second connection pin 12B. The driving motor 15 as the driving section is connected with this auxiliary control shaft 12 through a later-mentioned speed reducer 20. Driving motor 15 is driven and controlled by a control section 19 storing and executing various control operations.

The variable compression ratio mechanism 1 utilizing such a multi-link piston-crank mechanism makes it possible to improve the fuel consumption and the output by adjusting the engine compression ratio properly in accordance with the engine operating condition or conditions, and moreover to adjust a piston stroke characteristic to a desirable form such as a characteristic close to a simple harmonic oscillation in contrast to a single link mechanism connecting a piston and a crank shaft with a single link. Furthermore, as compared to the single link mechanism, it is possible to make longer the piston stroke with respect to the crank throw, so that is possible to reduce the total height of the engine and make the compression ratio higher. Furthermore, it is possible to reduce or adjust a thrust load acted upon the piston 2 and cylinder by adjusting the inclination of upper link 3, and to reduce the weights of the piston and cylinder.

Moreover, since, in the illustrated example, control link 7 is connected with lower link 5, the driving motor 15 and connecting mechanism 10 connected with control link 7 can be disposed in a lower region obliquely below crank shaft 4 where it is relatively easy to find a room, and hence this arrangement is convenient for mounting in the engine. However, it is possible to employ the arrangement in which control link 7 is connected with upper link 3. Furthermore, the driving section is not limited to driving motor 15. For example, the driving section may be a hydraulic actuator using a oil pressure control valve.

Figure 3:
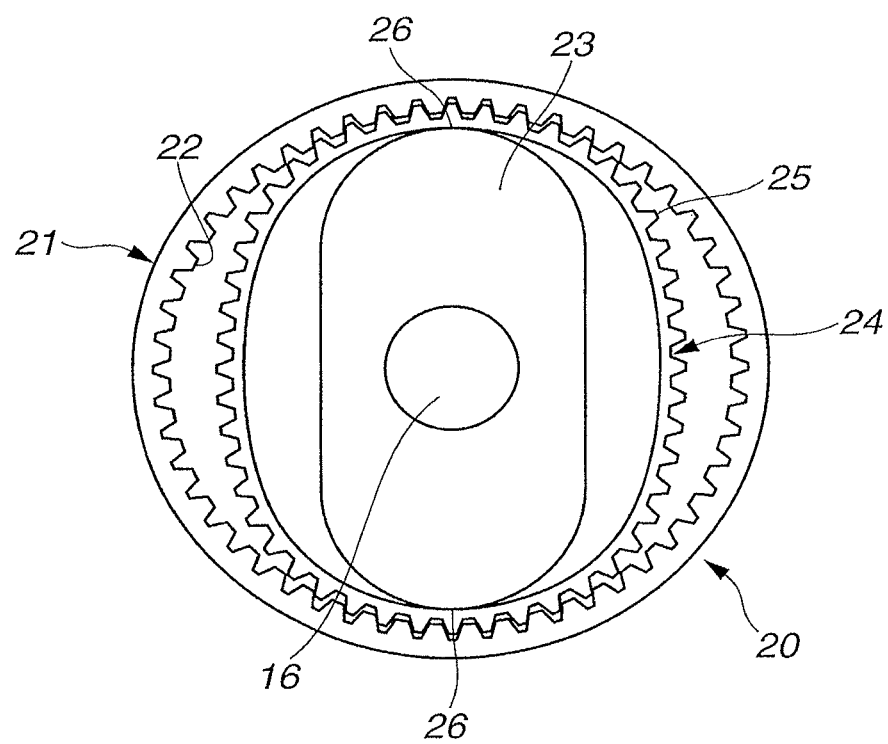
FIG. 3 is a view for illustrating a wave motion gearing speed reducer in the above-mentioned embodiment.

The speed reducer 20 of a wave motion gearing type is interposed between a motor rotation shaft 16 of driving motor 15 and the auxiliary control shaft 12 of connecting mechanism 10, as shown in FIGS. 2 and 3. In this practical example, the rotation shaft 16 of driving motor 15 is united integrally with an input shaft of speed reducer 20, and the auxiliary 12 is united integrally with an output shaft of speed reducer 20. However, it is possible to form these shafts in the form of discrete shafts not united.

Speed reducer 20 is disposed, together with auxiliary control shaft 12, in the housing 14. Driving motor 15 is attached to this housing 14. Housing 14 is fixed alongside to an oil pan side wall 17, from the outside of the engine. Oil pan side wall 17 is formed with a slit 17A for insertion of connecting link 13.

As shown in FIG. 3, the wave motion gearing speed reducer 20 includes, as main parts: a rigid gear 21 of rigid body formed with internal teeth 22 in the inside circumference of rigid gear 21; a wave generator 23 disposed coaxially inside the rigid gear 21; and a flexible gear 24 disposed coaxially between wave generator 23 and rigid gear 21. Flexible gear 24 is arranged to be deformed elastically into an elliptic shape, by wave generator 23. Flexible gear 24 is formed with external teeth 25 in the outside circumference of flexible gear 24. The external teeth 25 of flexible gear 24 are engaged with the internal teeth 22 of rigid gear 21 at two positions 26 in a direction of a major axis of the elliptic shape.

Wave generator 23 has an elliptical shape. Wave generator 23 is fixed, at a center portion, to the rotation shaft 16 of driving motor 15, and arranged to rotate as unit with the rotation shaft 16. The flexible gear 24 is made of metallic material having a flexibility to deflect radially in conformity with the elliptical shaft of wave generator 23. There is provided a ball bearing (omitted in the figure) on the radial inner side of flexible gear 24, and the flexible gear 24 is capable of rotating relative to wave generator 23.

The number of internal teeth 22 and the number of external teeth 25 are different from each other, and the teeth number difference therebetween is set equal to two teeth. When the wave generator 23 rotate one revolution, the rigid gear 21 and flexible gear 24 rotate relative to each other by an amount corresponding to the teeth number difference therebetween.

Speed reducer 20 of this embodiment employs a ring type structure using an auxiliary rigid gear 27, to take out an output power from the rigid gear 21. This auxiliary rigid gear 27 is disposed adjacent to the rigid gear 21 in the axial direction, and fixed to housing 14. Auxiliary rigid gear 27 also includes internal teeth formed in the inside circumference. However, the number of the internal teeth of auxiliary rigid gear 27 is equal to the number of external teeth 25 of flexible gear 24. That is, the auxiliary rigid gear 27 functions as a kind of gear coupling, and the rigid gear 21 rotates by the amount of the teeth number difference in response to one revolution of wave generator 23.

The structure of speed reducer 20 is not limited to that of the above-mentioned embodiment. It is possible to employ a cup type structure in which rigid gear 21 is fixed to housing 14, and an output power is taken out from the flexible gear 24 shaped like a cup.

The thus-constructed wave motion gearing type speed reducer 20 has advantages of a smaller number of required parts, smaller size and light weight, and yet this speed reducer 20 can provide a very large reduction ratio. Moreover, since no backlash is required, the engaging efficiency is high, and the controllability and reliability are high. On the other hand, the wave motion gearing type speed reducer 20 might undergo a phenomenon called ratcheting that is slippage or shift of engaging or meshing position or positions of the internal teeth 22 and the external teeth 25 of speed reducer 20. Therefore, if the system is arranged to sense only the rotational position of rotation shaft 16 of driving motor 15 (the input shaft of the speed reducer), to control the driving motor 15, for example, the system is unable to detect occurrence of the ratcheting, and hence liable to suffer a deviation between the sensed value or sensed quantity and the actual compression ratio corresponding to the actual rotational position.

The deviation between the sensed quantity and the actual compression ratio causes following problems. When, for example, the actual compression ratio deviates from the sensed quantity, to a lower compression ratio's side, this deviation might cause disadvantages such as deterioration of the fuel consumption and output power, deterioration of the durability of exhaust parts due to the temperature increase of the exhaust gas mixture and deterioration of catalyst. In the case of the deviation of the actual compression ratio from the sensed quantity to a higher compression ratio's side, the deviation might cause excessive approach between an intake or exhaust valve and a piston, and knocking.

Furthermore, in the case of control near the highest compression ratio or lowest compression ratio to which limitation is imposed mechanically with a stopper, the rotational position of control shaft 11 might reach the stopper position of the highest or lowest compression ratio before the sensed quantity or compression ratio reaches the target compression ratio, and hence the control system might be unable to control the compression ratio to the target compression ratio, resulting in a control error.

Moreover, if, in the state unable to detect the ratcheting, the slippage or shift of the engaging position is increased by the ratcheting to a value greater than or equal to a predetermined level, the forward tips of internal teeth 22 and external teeth 25 might be worn away, and the wear might lower a ratcheting producing torque, thereby cause an abrupt and great deviation of the compression ratio due to application of great torque and aggravate the above-mentioned problems.

Moreover, wear or abrasion powder of the tooth tips might increase the friction by being seized in the tooth surfaces and ball bearing, and deteriorate the response.

Therefore, in this practical example, as explained hereinafter, the above-mentioned problems are avoided by judging or detecting accurately occurrence of ratcheting. Specifically, there are provided an input shaft rotation sensing sensor 31 to sense the rotational position of the motor rotation shaft 16 which is the input shaft of speed reducer 20, and an output shaft rotation sensing sensor 32 to sense the rotational position of the auxiliary control shaft 12 which is the output shaft of speed reducer 20. The occurrence of ratcheting is judged or detected by the use of the sensed quantities or sensed values of the sensors 31 and 32.

Figure 4:
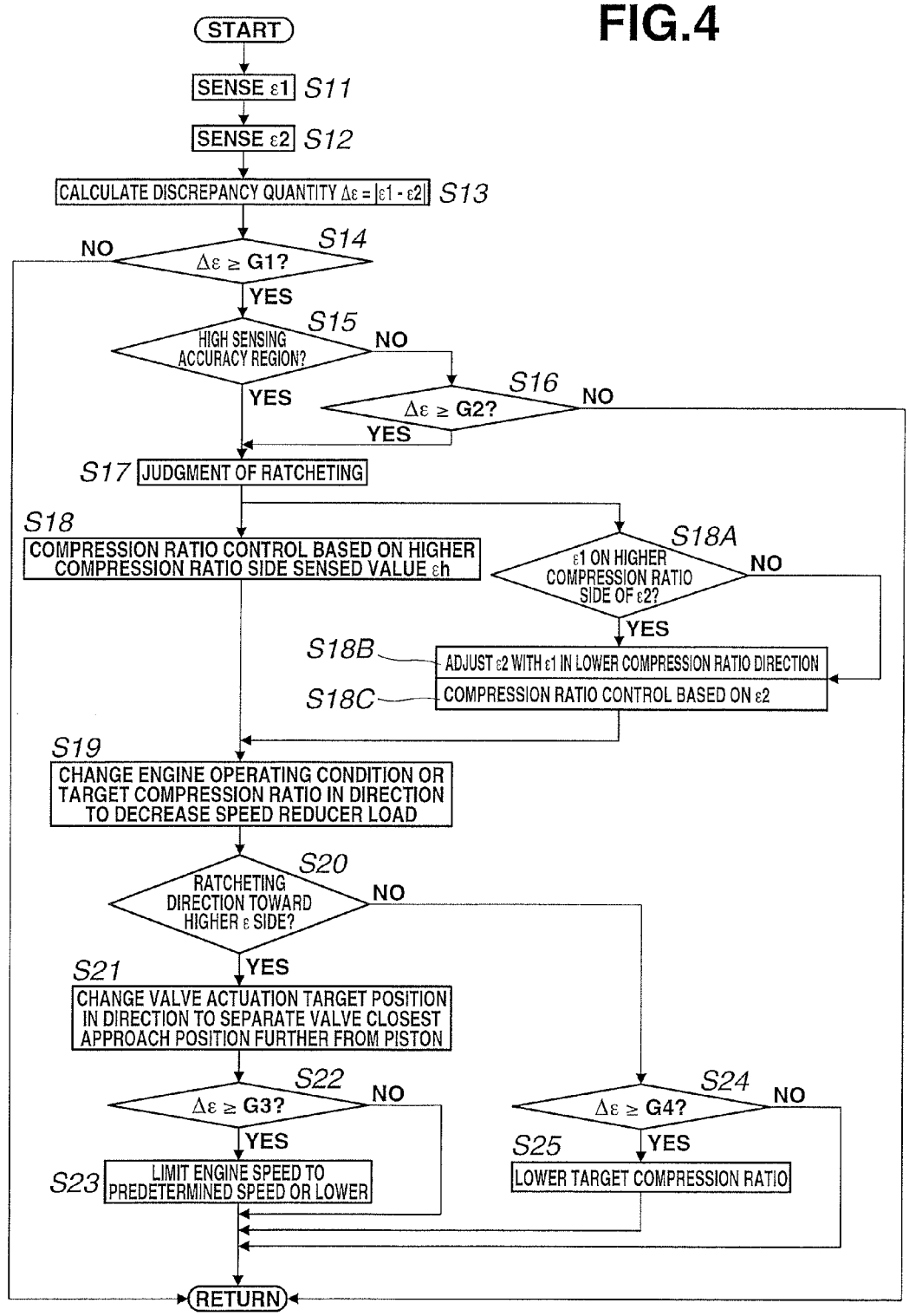
FIG. 4 is a flowchart showing a flow of control process including a ratcheting judging process of the above-mentioned speed reducer.

FIG. 4 is a flowchart showing a control flow including such a process for judging ratcheting. This routine is stored in the above-mentioned control section 19, and executed repeatedly at regular time intervals (of 10 ms, for example).

At a step S11, the control section reads a first sensed quantity or value $\epsilon 1$ corresponding to an actual compression ratio, sensed by the input shaft rotation sensing sensor 31. At a step S12, the control section reads a second sensed quantity or value $\epsilon 2$ corresponding to the actual compression ratio, sensed by the output shaft rotation sensing sensor 32. At a step S13, the control section calculate a discrepancy quantity $\Delta \epsilon$ which is equal to an absolute value $|\epsilon 1 - \epsilon 2|$ of a difference between the first sensed quantity $\epsilon 1$ and the second sensed quantity $\epsilon 2$.

At a step S14, the control section determines whether the discrepancy quantity $\Delta \epsilon$ is greater than or equal to a first predetermined value G1 corresponding to a slippage or displacement of the engaging or meshing position(s) of internal teeth 22 and external teeth 25, by an amount of one tooth. The control section proceeds to a step S15 when the discrepancy quantity $\Delta \epsilon$ is greater than or equal to the first predetermined value G1. When the discrepancy quantity $\Delta \epsilon$ is smaller than the first predetermined value G1, the control section judges that ratcheting is not present and terminates this routine.

At the step S15, the control section determines whether an operating point is in a high sensing accuracy region in which a one tooth slippage or displacement of the engaging position is detectable. This judgment is performed by using the first sensed quantity $\epsilon 1$ or the second sensed quantity $\epsilon 2$, for example. In the case of the high sensing accuracy region, the control section proceeds to a step S17, skipping a step S16, and judges or detects, at S17, the occurrence of ratcheting.

On the other hand, when the operating point is not in the high sensing accuracy region, the control section proceeds to step S16, and determines whether the discrepancy quantity $\Delta \epsilon$ is greater than or equal to a second predetermined value G2 corresponding to the slippage or displacement of the engaging or meshing position(s) of internal teeth 22 and external teeth 25, by an amount of a plurality of teeth (two teeth, for example). The second predetermined value G2 is a value greater than the first predetermined value G1. When the discrepancy quantity $\Delta \epsilon$ is greater than or equal to the second predetermined value G2, the control section proceeds to the above-mentioned step S17, and judges that ratcheting is present. When the discrepancy quantity $\Delta \epsilon$ is smaller than the second predetermined value G2, the control section judges that ratcheting is not present and terminates this routine.

In the case of the judgment of the occurrence of ratcheting, the control section proceeds from step S17 to a step S18. At step S18, the control section selects a sensed quantity $\epsilon h$ used for the driving control of deriving motor 15 or the like, from the first and second sensed quantities. The sensed quantity $\epsilon h$ is one of the first sensed quantity $\epsilon 1$ and second sensed quantity $\epsilon 2$, and the sensed quantity $\epsilon h$ has a value on a high compression ratio's side with respect to a value of the other of the first sensed quantity $\epsilon 1$ and second sensed quantity $\epsilon 2$. The control section 19 determines a target compression ratio on the basis of the thus-selected sensed quantity $\epsilon h$, and controls the driving condition of driving motor 15.

It is possible to perform operations of steps S18A~S18C, instead of the operation of step S18. In the steps S18A~S18C, one of the sensed quantities is selected preliminarily as a selected sensed quantity used for the driving control of deriving motor 15 or the like (in this example, the preliminarily selected sensed quantity is the second sensed quantity $\epsilon2$ on the output shaft's side higher in the control accuracy). Specifically, at step S18A, the control section determines whether the first sensed quantity $\epsilon1$ on the input shaft's side not used for the control has a value of a higher compression ratio than the second sensed quantity $\epsilon2$ on the output shaft's side used for the control. When the value of first sensed quantity $\epsilon1$ is not a value of the higher compression ratio than the second sensed quantity $\epsilon2$, that is, the first sensed quantity $\epsilon1$ is equal to a value of a lower compression ratio than the second sensed quantity $\epsilon2$, the control section skips step S18B, and proceeds to the later-mentioned step S18C.

When the first sensed quantity $\epsilon1$ is equal to a value on the higher compression ratio's side of second sensed quantity $\epsilon2$, the control section proceeds to step S18B, and modifies the second sensed quantity $\epsilon2$ to be used for the control in the direction to a lower compression ratio, in accordance with the first sensed quantity $\epsilon1$ not to be used for the control (in accordance with the discrepancy quantity $\Delta\epsilon$ between both sensed quantities, to be exact). Then, the control section proceeds to step S18C. At step S18C, the control section performs the compression ratio control on the basis of the more accurate second sensed quantity $\epsilon2$ on the output shaft's side. Thus, the control section 19 determines the target compression ratio on the basis of the sensed quantity $\epsilon2$, and controls the driving condition of driving motor 15.

At a step S19, the control section adjusts or vary the engine operating condition such as the engine rotational speed or the requested load, or the setting of the target compression ratio, in the direction to reduce the load of speed reducer 20.

At a step S20, the control section determines the direction of the ratcheting, that is, whether or not the direction of the slippage or displacement of the engaging position(s) is to the higher compression ratio's side.

When the direction of the ratcheting is the direction to the higher compression ratio's side, the control section proceeds to a step S21, and adjusts a target value of an operating characteristic of an intake or exhaust valve by a variable valve actuating mechanism 18 (cf. FIG. 2) in a direction to increase a closest approach distance between the piston 2 and the intake or exhaust valve to which the variable valve actuating mechanism 18 is applied. As the variable valve actuating mechanism 18, it is possible to employ a known mechanism such as a valve timing control mechanism (VTC) varying both of the valve opening timing and valve closing timing of the intake or exhaust valve simultaneously and continuously or a lift and operation angle varying mechanism (VEL) varying the valve operation angle and the valve lift of the intake or exhaust valve simultaneously and continuously.

At a next step S22, the control section determines whether the discrepancy quantity $\Delta\epsilon$ is greater than or equal to a third predetermined value G3 or not. When the discrepancy quantity $\Delta\epsilon$ is smaller than the third predetermined value G3, then the control section terminates this routine. When the discrepancy quantity $\Delta\epsilon$ is greater than or equal to the third predetermined value G3, the control section proceeds to a step S23, and limits the engine rotational speed to a value lower than or equal to a predetermined rotation speed.

When the judgment of step S20 is that the direction of the ratcheting is not toward the higher compression ratio's side, but toward the lower compression ratio's side, the control section proceeds to a step S24, and determines whether the discrepancy quantity $\Delta\epsilon$ is greater than or equal to a fourth predetermined value G4 or not. The fourth predetermined value G4 may be set equal to the third predetermined value G3 for simplification, or may be set equal to a value different from the third predetermined value G3 for adaptation or adjustment. When the discrepancy quantity $\Delta\epsilon$ is smaller than the fourth predetermined value G4, then the control section terminates this routine. When the discrepancy quantity $\Delta\epsilon$ is greater than or equal to the fourth predetermined value G4, the control section proceeds to a step S25, and adjusts the target compression ratio to the lower compression ratio's side.

Constructional features and effects of this embodiment are explained below.

[1] The speed reducer 20 is disposed between the driving motor 15 serving as a driving section and the variable compression ratio mechanism or compression ratio varying mechanism 1 serving as a driven section driven by driving motor 15. This speed reducer 20 transmits rotation from the rotation shaft of driving motor 15 (the input shaft of the speed reducer), at a reduced speed to the auxiliary control shaft 12 (the output shaft of the speed reducer).

This speed reducer 20 is a so-called wave motion gearing speed reducer or strain wave gearing speed reducer including the rigid gear 21, flexible gear 24 and wave generator 23 which are disposed on the same axis. With respect to one revolution of wave generator 23, the rigid gear 21 and the flexible gear 24 rotate relative to each other by an amount corresponding to a teeth number difference which is a difference between the number of internal teeth 22 of rigid gear 21 and the number of external teeth 25 of flexible gear 24.

Furthermore, in this embodiment, there are provided the input shaft rotation sensing sensor 31 serving as an input shaft rotation sensing section to sense the rotational position of the input shaft of the speed reducer 20 (the motor rotation shaft 16), and the output shaft rotation sensing sensor 32 serving as an output shaft rotation sensing section to sense the rotational position of the output shaft (the auxiliary control shaft 12) of the speed reducer 20. The apparatus of this embodiment judges or detects occurrence of ratchetting denoting slippage or shift of the engaging position or positions between internal teeth 22 and external teeth 25 when the discrepancy quantity $\Delta\epsilon$ between the sensed quantities or sensed rotational positions of both sensors is greater than or equal to a predetermined value.

By sensing the rotational positions of the input shaft and the output shaft of the speed reducer individually in this way, the apparatus of this embodiment can judge or detect the occurrence of ratcheting accurately from the discrepancy quantity $\Delta\epsilon$. Therefore, the apparatus of this embodiment can effectively restrain or avoid a decrease in the control accuracy in the compression ratio control and a decrease in the operability or drivability due to the ratcheting.

[2] As the output shaft rotation sensing sensor 32, the apparatus employs a sensor having an accuracy capable of sensing a slippage of a predetermined teeth number, of the engaging position(s) between internal teeth 22 and external teeth 25 of speed reducer 20 in the predetermined high sensing accuracy region. For example, the apparatus uses a sensor having an accuracy capable of sensing a slippage of an amount corresponding to one tooth. When, for example, the number of teeth is 320 and the reduction ratio is 160, the apparatus uses an absolute angle sensor capable of sensing or detecting a slippage of an amount approximately equal to one degree, corresponding to a slippage or displacement of one tooth in the predetermined high sensing accuracy region.

Therefore, in the high sensing accuracy region α1 as shown in FIG. 5(A) as an example, the apparatus can detect occurrence of the ratcheting of one tooth (steps S14, S15 and S17), and eliminate the need for the high sensing accuracy over the entire region. Accordingly, it is possible to employ a sensor of a small size and a low cost having a sensing accuracy lowering in a part of angle regions when the sensing angle width is increased, and hence to reduce the size of the sensor and lower the cost.

[3] As shown in FIG. 5A, as an example, the apparatus is capable of judging occurrence of the ratcheting when the discrepancy quantity $\Delta\epsilon$ of the sensed quantities is greater than or equal to a first predetermined value G1 corresponding to the slippage of an amount equal to or greater than one tooth between the internal teeth and the external teeth, in the high sensing accuracy region α1 (steps S14, S15, S17). Even the ratcheting of one tooth can cause an incorrect or improper engaging state increasing the friction in speed reducer 20, deteriorating the response in the control of varying the compression ratio and allowing the possibility of occurrence of knocking in the case of acceleration in the high compression ratio state, for example. With the capability of detecting one tooth slippage or shift, the apparatus can restrain or avoid occurrence of such knocking.

[4] In a region or regions α2, α3 other than the high sensing accuracy region α1, the apparatus judges occurrence of the ratcheting when the discrepancy quantity $\Delta\epsilon$ of the sensed quantities is greater than or equal to a second predetermined value G2 corresponding to a slippage of a teeth number greater than the predetermined teeth number such as a slippage of two or more teeth (S15, S16, S17). Therefore, the apparatus can judge ratcheting of two or more teeth accurately even in a region in which the sensing accuracy is lower.

[5] When the ratchetting is produced, the apparatus decreases the load torque of speed reducer 20 (S19). By decreasing the load torque of speed reducer 20, the apparatus can restrain or avoid continuation of the ratcheting.

[6] In this embodiment, the variable compression ratio mechanism 1 is employed as an example of the driven section. In the drive apparatus of variable compression ratio mechanism 1, the driving motor 15 of the driving section receives combustion load and inertia load repeatedly each combustion interval, so that the use of wave motion gearing type speed reducer 20 providing a large reduction ratio is very effective. This driving motor 15 is controlled by the control section 19. Control section 19 sets the target compression ratio in accordance with the engine operating condition such as the engine rotational speed and/or required load, and controls the driving motor 15 in accordance with the thus-set target compression ratio.

Figure 5:
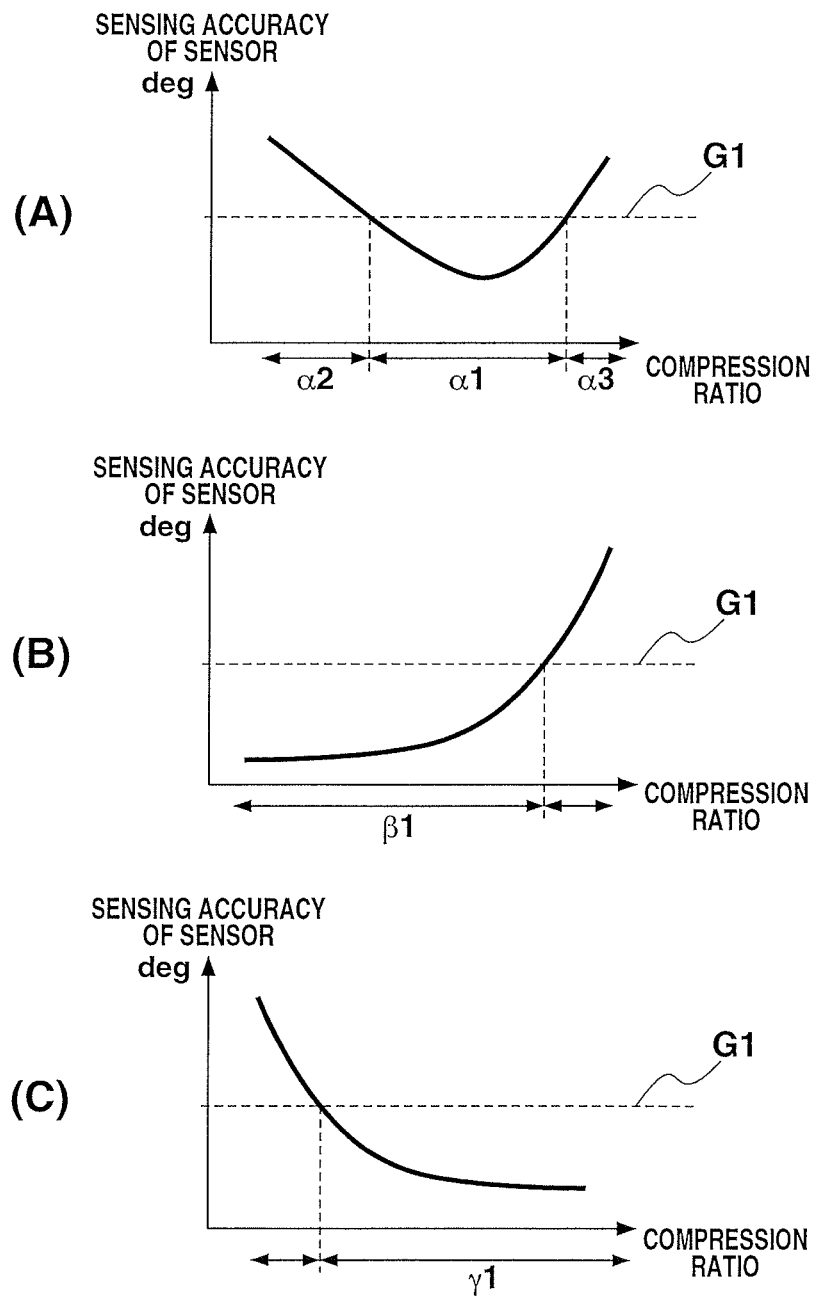
FIG. 5 is a view for illustrating three examples (A)~(C) of the sensing accuracy of an output shaft rotation sensing sensor.

[7] FIG. 5 shows the sensing accuracy (the minimum angle which can be detected) of output shaft rotation sensor 32, in terms of the quantity which becomes lower as the sensing accuracy becomes higher. A sensor in an example shown in FIG. 5(A) has an accuracy capable of sensing a one tooth slippage of the internal and external teeth of the speed reducer only in a predetermined region α1 of a medium compression ratio. In other words, the medium compression ratio region α1 is set as the high sensing accuracy region capable of sensing a one tooth slippage, and the sensor has the accuracy capable of sensing a value lower than the first predetermined value G1 corresponding to a one tooth slippage. In this case, the apparatus can detect a ratcheting of one tooth slippage securely in the condition of the medium compression ratio in which the greatest load torque is applied.

[8] A sensor in an example shown in FIG. 5(B) has an accuracy capable of sensing a one tooth slippage only in a predetermined low or lower compression ratio region β1 including a lowest compression ratio. In this low compression ratio region β1, the driving motor 15 might collide against a stopper at a high rotational speed with assistance of an in-cylinder pressure. The apparatus can restrain or avoid such a collision by sensing a ratcheting of one tooth slippage.

[9] A sensor in an example shown in FIG. 5(C) has an accuracy capable of sensing a one tooth slippage only in a predetermined high or higher compression ratio region γ1 including a highest compression ratio. In the high compression ratio region, the load torque of the speed reducer increases in case of collision against the stopper by being driven in the high compression ratio direction by the driving motor 15. The apparatus can restrain or avoid such an increase of the load torque of the speed reducer by sensing a ratchetting of one tooth slippage.

[10] Alternatively, it is possible to employ a construction having an accuracy capable of sensing a one tooth slippage in two or more of the above-mentioned medium compression ratio region, the low compression ratio region including the lowest compression ratio and the high compression ratio region including the highest compression ratio.

[11] When the ratcheting is produced and the discrepancy quantity $\Delta\epsilon$ is greater than or equal to the fourth predetermined value G4, the target compression ratio is adjusted to a lower compression ratio (steps S17, S24, S25). With this configuration, despite a possibility of abnormal increase of the actual compression ratio due to a ratcheting when the first sensed quantity $\epsilon 1$ on the input shaft's side is smaller than the second sensed quantity $\epsilon 2$ on the output shaft's side, the apparatus can avoid an excessive approach between a valve and a piston by decreasing the target compression ratio. When the first sensed quantity $\epsilon 1$ on the input shaft's side is greater than the second sensed quantity $\epsilon 2$ on the output shaft's side, the actual compression ratio might be decreased abnormally by a ratcheting. Therefore, by decreasing the target compression ratio, the apparatus can reduce the load torque applied to the speed reducer 20 and thereby restrain or avoid further occurrence of the ratcheting.

[12] At the time of occurrence of ratcheting, the target compression ratio is set (step S18) by using a higher compression ratio representing sensed quantity $\epsilon h$ which is one of the first sensed quantity $\epsilon 1$ on the input shaft's side and the second sensed quantity $\epsilon 2$ on the output shaft's side, and which represents a relatively high compression ratio as compared to the other of the first and second sensed quantities. When there is a discrepancy or difference between the two sensed quantities, it is not possible to judge which one is proper. Accordingly, the apparatus can restrain an excessive shift to the high compression side and restrain an excessive approach between the valve and piston by setting the target compression ratio by the use of the sensed quantity $\epsilon h$ on the higher compression ratio's side.

[13] The apparatus may be arranged to control the driving motor 15 by using either one of the two sensed quantities at the time of occurrence of ratcheting. For example, at step S18C, the apparatus is configured to control the driving condition of the driving motor in accordance with the second sensed quantity $\epsilon 2$ on the more accurate output shaft's side. In this case, if the first sensed quantity $\epsilon 1$ not used for the control assumes a value representing a higher compression ratio as compared to the second sensed quantity $\epsilon 2$, the apparatus modifies or adjusts the second sensed quantity $\epsilon 2$ to the lower compression ratio's side (S18A, S18B) in accordance with the discrepancy quantity Δε of the sensed quantities.

When the second sensed quantity ε2 used for the motor control assumes a value on the lower compression ratio's side as compared to the first sensed quantity ε1 not used for the control, the apparatus considers that the correct or proper value is the first sensed quantity ε1 having a value of a higher compression ratio on a safe side, to avoid an excessive approach of the valve and piston, and modifies the second sensed quantity ε2 to be used for the motor control to the lower compression ratio's side. With this modification, the apparatus can avoid excessive approach between the valve and piston, enable continuous use of the output shaft rotation sensing sensor 32 having a higher accuracy as a sensor used for the motor control, and maintain the accurate compression ratio control.

[14] The apparatus adjusts a target value of the operating characteristic of the variable valve actuating mechanism 18 (step S21) to increase a closest approach distance between a piston and an intake or exhaust valve if the ratchetting direction is to the higher compression ratio's side. With this adjustment, the apparatus can prevent securely the closest approach distance between the valve and the piston from being decreased excessively by the compression ratio made higher by the ratcheting.

[15] The apparatus limits the engine rotational speed to a range equal to or lower than a predetermined speed when the ratchetting direction is to the higher compression ratio's side and at the same time the discrepancy quantity Δε is greater than or equal to the third predetermined value G3 (steps S20, S22, S23). By limiting the engine rotational speed in this way, the apparatus can restrain variation in the direction to the higher compression ratio's side by the inertial force, and prevent securely the compression ratio from being made excessively high.

[16] It is possible to employ the arrangement, not shown in the figures, in which the output shaft rotation sensing sensor 32 as the output shaft rotation sensing section is disposed on the part of, or near, the control shaft 11 and the input shaft rotation sensing sensor 31 as the input rotation sensing section is disposed between the auxiliary control shaft 12 and the driving motor 15.

In this case, with the compression ratio-reduction ratio characteristic provided by the connecting mechanism 10 including connecting link 13 and other members, it is possible to set the high sensing accuracy region at an arbitrary compression ratio region as shown in FIGS. 5(A)~5(C). Accordingly, it is possible to set the high sensing accuracy region of the sensor itself at a compression ratio region requiring detection of the ratcheting, and set the relatively lower sensing accuracy region at other compression ratio region or regions.

Although the invention has been described above with reference to certain embodiment or embodiments of the invention, the invention is not limited to the embodiment(s) described above. Various modifications and variations are within the purview of the present invention. For example, in the above-mentioned embodiment, the driven section includes the variable compression ratio mechanism. However, the present invention is also applicable to drive apparatus including the driven section employing other mechanism or driven unit such as the variable valve actuating mechanism.

The invention claimed is:

1. A drive apparatus comprising:
a driving unit;
a driven unit driven by the driving unit; and
a speed reducer disposed between the driving unit and the driven unit and arranged to transmit rotation at a reduced speed from an input shaft connected with the driving unit to an output shaft connected with the driven unit;
the speed reducer being a wave motion gearing speed reducer including:
a rigid gear including an inside circumference formed with internal teeth;
a wave generator disposed coaxially in the rigid gear; and
a flexible gear which is disposed coaxially between the wave generator and the rigid gear, which is arranged to be deflected elastically into an elliptical shape by the wave generator, and which includes an outside circumference formed with external teeth engaging with the internal teeth at two positions in a direction of a major axis of the elliptical shape, the flexible gear and the rigid gear being arranged to rotate relative to each other by an amount corresponding to a teeth number difference which is a difference of numbers of the internal teeth and the external teeth when the wave generator is rotated one revolution,
the drive apparatus further comprising:
an input shaft rotation sensor to sense a rotational position of the input shaft of the speed reducer;
an output shaft rotation sensor to sense a rotational position of the output shaft of the speed reducer; and
a controller configured to judge occurrence of a ratcheting that is slipping of an engaging position of the internal teeth and the external teeth when a discrepancy quantity between a sensed quantity of the input shaft rotation sensor and a sensed quantity of the output shaft rotation sensor is greater than or equal to a predetermined value,
wherein the driven unit includes a variable compression ratio mechanism to vary an engine compression ratio of an internal combustion engine in accordance with a rotational position of a control shaft driven by the driving unit, and the controller is configured to set a target compression ratio in accordance with an engine operating condition, and to control a driving condition of the driving unit in accordance with the target compression ratio, and
wherein the controller is configured to set the target compression ratio by using a sensed quantity representing a relatively high compression ratio at a time of occurrence of the ratcheting.

2. The drive apparatus as claimed in claim 1, wherein the output shaft rotation sensor has an accuracy for sensing a slippage of a predetermined teeth number between the internal teeth and the external teeth of the speed reducer at least in a predetermined high sensing accuracy region.

3. The drive apparatus as claimed in claim 2, wherein the controller is configured to judge occurrence of the ratcheting when the discrepancy quantity of the sensed quantities is greater than or equal to a first predetermined value corresponding to the slippage of the predetermined teeth number of the internal teeth and the external teeth of the speed reducer, in the high sensing accuracy region.

4. The drive apparatus as claimed in claim 3, wherein the controller is configured to judge occurrence of the ratcheting when the discrepancy quantity of the sensed quantities is greater than or equal to a second predetermined value corresponding to a slippage of a teeth number greater than the predetermined teeth number of the internal teeth and the external teeth of the speed reducer, in a region other than the high sensing accuracy region.

5. The drive apparatus as claimed in claim 1, wherein the drive apparatus further comprises a speed reducer load decreasing section to decrease a load of the speed reducer at a time of occurrence of the ratcheting.

6. The drive apparatus as claimed in claim 1, wherein the output shaft rotation sensor has an accuracy for sensing the slippage of the predetermined teeth number between the internal teeth and the external teeth of the speed reducer only in a predetermined medium compression ratio region.

7. The drive apparatus as claimed in claim 1, wherein the output shaft rotation sensor has an accuracy for sensing the slippage of the predetermined teeth number between the internal teeth and the external teeth of the speed reducer only in a predetermined low compression ratio region including a lowest compression ratio.

8. The drive apparatus as claimed in claim 1, wherein the output shaft rotation sensor has an accuracy for sensing the slippage of the predetermined teeth number between the internal teeth and the external teeth of the speed reducer only in a predetermined high compression ratio region including a highest compression ratio.

9. The drive apparatus as claimed in claim 1, wherein the output shaft rotation sensor has an accuracy for sensing the slippage of the predetermined teeth number between the internal teeth and the external teeth of the speed reducer in two or more of a predetermined medium compression ratio region, a predetermined low compression ratio region including a lowest compression ratio, and a predetermined high compression ratio region including a highest compression ratio.

10. A drive apparatus comprising:
a driving unit;
a driven unit driven by the driving unit; and
a speed reducer disposed between the driving unit and the driven unit and arranged to transmit rotation at a reduced speed from an input shaft connected with the driving unit to an output shaft connected with the driven unit;
the speed reducer being a wave motion gearing speed reducer including:
  a rigid gear including an inside circumference formed with internal teeth;
  a wave generator disposed coaxially in the rigid gear; and
  a flexible gear which is disposed coaxially between the wave generator and the rigid gear, which is arranged to be deflected elastically into an elliptical shape by the wave generator, and which includes an outside circumference formed with external teeth engaging with the internal teeth at two positions in a direction of a major axis of the elliptical shape, the flexible gear and the rigid gear being arranged to rotate relative to each other by an amount corresponding to a teeth number difference which is a difference of numbers of the internal teeth and the external teeth when the wave generator is rotated one revolution,
the drive apparatus further comprising:
  an input shaft rotation sensor to sense a rotational position of the input shaft of the speed reducer;
  an output shaft rotation sensor to sense a rotational position of the output shaft of the speed reducer; and
  a controller configured to judge occurrence of a ratcheting that is slipping of an engaging position of the internal teeth and the external teeth when a discrepancy quantity between a sensed quantity of the input shaft rotation sensor and a sensed quantity of the output shaft rotation sensor is greater than or equal to a predetermined value,
wherein the driven unit includes a variable compression ratio mechanism to vary an engine compression ratio of an internal combustion engine in accordance with a rotational position of a control shaft driven by the driving unit, and the controller is configured to set a target compression ratio in accordance with an engine operating condition, and to control a driving condition of the driving unit in accordance with the target compression ratio, and
wherein the controller is configured to adjust the target compression ratio to a lower side at a time of occurrence of the ratcheting.

11. A drive apparatus comprising:
a driving unit;
a driven unit driven by the driving unit; and
a speed reducer disposed between the driving unit and the driven unit and arranged to transmit rotation at a reduced speed from an input shaft connected with the driving unit to an output shaft connected with the driven unit;
the speed reducer being a wave motion gearing speed reducer including:
  a rigid gear including an inside circumference formed with internal teeth;
  a wave generator disposed coaxially in the rigid gear; and
  a flexible gear which is disposed coaxially between the wave generator and the rigid gear, which is arranged to be deflected elastically into an elliptical shape by the wave generator, and which includes an outside circumference formed with external teeth engaging with the internal teeth at two positions in a direction of a major axis of the elliptical shape, the flexible gear and the rigid gear being arranged to rotate relative to each other by an amount corresponding to a teeth number difference which is a difference of numbers of the internal teeth and the external teeth when the wave generator is rotated one revolution,
the drive apparatus further comprising:
  an input shaft rotation sensor to sense a rotational position of the input shaft of the speed reducer;
  an output shaft rotation sensor to sense a rotational position of the output shaft of the speed reducer; and
  a controller configured to judge occurrence of a ratcheting that is slipping of an engaging position of the internal teeth and the external teeth when a discrepancy quantity between a sensed quantity of the input shaft rotation sensor and a sensed quantity of the output shaft rotation sensor is greater than or equal to a predetermined value,
wherein the driven unit includes a variable compression ratio mechanism to vary an engine compression ratio of an internal combustion engine in accordance with a rotational position of a control shaft driven by the driving unit, and the controller is configured to set a target compression ratio in accordance with an engine operating condition, and to control a driving condition of the driving unit in accordance with the target compression ratio, and wherein the controller is configured to control the driving condition of the driving unit in accordance with a first sensed quantity which is one of the sensed quantities of the input shaft rotation sensor and the output shaft rotation sensor at the time of the occurrence of the ratcheting, and to adjust the first sensed quantity in a direction to lower the compression ratio in accordance with the discrepancy quantity of the sensed quantities if a second sensed quantity which is the other of the sensed quantities of the input shaft rotation sensor and the output shaft rotation sensor is equal to a value representing a higher compression ratio than a value of the first sensed quantity.

12. A drive apparatus comprising:
a driving unit;
a driven unit driven by the driving unit; and
a speed reducer disposed between the driving unit and the driven unit and arranged to transmit rotation at a reduced speed from an input shaft connected with the driving unit to an output shaft connected with the driven unit;
the speed reducer being a wave motion gearing speed reducer including:
  a rigid gear including an inside circumference formed with internal teeth;
  a wave generator disposed coaxially in the rigid gear; and
  a flexible gear which is disposed coaxially between the wave generator and the rigid gear, which is arranged to be deflected elastically into an elliptical shape by the wave generator, and which includes an outside circumference formed with external teeth engaging with the internal teeth at two positions in a direction of a major axis of the elliptical shape, the flexible gear and the rigid gear being arranged to rotate relative to each other by an amount corresponding to a teeth number difference which is a difference of numbers of the internal teeth and the external teeth when the wave generator is rotated one revolution,
the drive apparatus further comprising:
  an input shaft rotation sensor to sense a rotational position of the input shaft of the speed reducer;
  an output shaft rotation sensor to sense a rotational position of the output shaft of the speed reducer;
  a controller configured to judge occurrence of a ratcheting that is slipping of an engaging position of the internal teeth and the external teeth when a discrepancy quantity between a sensed quantity of the input shaft rotation sensor and a sensed quantity of the output shaft rotation sensor is greater than or equal to a predetermined value; and
a valve actuating mechanism to vary an operating characteristic of an engine value which is an intake valve or an exhaust valve of an internal combustion engine,
wherein the driven unit includes a variable compression ratio mechanism to vary an engine compression ratio of an internal combustion engine in accordance with a rotational position of a control shaft driven by the driving unit, and the controller is configured to set a target compression ratio in accordance with an engine operating condition, and to control a driving condition of the driving unit in accordance with the target compression ratio, and
wherein the controller is configured to adjust a target value of the operating characteristic of the valve actuating mechanism to increase a closest approach distance between a piston and the engine valve at a time of occurrence of the ratchetting of slipping to a higher compression ratio side.

13. A drive apparatus comprising:
a driving unit;
a driven unit driven by the driving unit; and
a speed reducer disposed between the driving unit and the driven unit and arranged to transmit rotation at a reduced speed from an input shaft connected with the driving unit to an output shaft connected with the driven unit;
the speed reducer being a wave motion gearing speed reducer including:
  a rigid gear including an inside circumference formed with internal teeth;
  a wave generator disposed coaxially in the rigid gear; and
  a flexible gear which is disposed coaxially between the wave generator and the rigid gear, which is arranged to be deflected elastically into an elliptical shape by the wave generator, and which includes an outside circumference formed with external teeth engaging with the internal teeth at two positions in a direction of a major axis of the elliptical shape, the flexible gear and the rigid gear being arranged to rotate relative to each other by an amount corresponding to a teeth number difference which is a difference of numbers of the internal teeth and the external teeth when the wave generator is rotated one revolution,
the drive apparatus further comprising:
  an input shaft rotation sensor to sense a rotational position of the input shaft of the speed reducer;
  an output shaft rotation sensor to sense a rotational position of the output shaft of the speed reducer; and
  a controller configured to judge occurrence of a ratcheting that is slipping of an engaging position of the internal teeth and the external teeth when a discrepancy quantity between a sensed quantity of the input shaft rotation sensor and a sensed quantity of the output shaft rotation sensor is greater than or equal to a predetermined value,
wherein the driven unit includes a variable compression ratio mechanism to vary an engine compression ratio of an internal combustion engine in accordance with a rotational position of a control shaft driven by the driving unit, and the controller is configured to set a target compression ratio in accordance with an engine operating condition, and to control a driving condition of the driving unit in accordance with the target compression ratio, and
wherein the controller is configured to limit an engine rotational speed to a range equal to or lower than a predetermined speed when the ratchetting of slipping to a higher compression ratio side is detected and the discrepancy quantity is greater than or equal to a third predetermined value.

14. The drive apparatus as claimed in claim 2, wherein the predetermined teeth number is one tooth.

15. A drive method with a driving unit, a driven unit driven by the driving unit, and a speed reducer disposed between the driving unit and the driven unit and arranged to transmit rotation at a reduced speed from an input shaft connected with the driving unit to an output shaft connected with the driven unit,
the driven unit including a variable compression ratio mechanism to vary an engine compression ratio of an internal combustion engine in accordance with a rotational position of a control shaft driven by the driving unit, the speed reducer being a wave motion gearing speed reducer including:

a rigid gear including an inside circumference formed with internal teeth;

a wave generator disposed coaxially in the rigid gear; and a flexible gear which is disposed coaxially between the wave generator and the rigid gear, which is arranged to be deflected elastically into an elliptical shape by the wave generator, and which includes an outside circumference formed with external teeth engaging with the internal teeth at two positions in a direction of a major axis of the elliptical shape, the flexible gear being arranged to rotate relative to the rigid gear by an amount corresponding to a teeth number difference which is a difference of numbers of the internal teeth and the external teeth when the wave generator is rotated one revolution, there are provided an input shaft rotation sensor to sense a rotational position of the input shaft of the speed reducer, and an output shaft rotation sensor to sense a rotational position of the output shaft of the speed reducer, the drive method comprising:

judging occurrence of a ratcheting that is slipping of an engaging position of the internal teeth and the external teeth when a discrepancy quantity between a sensed quantity of the input shaft rotation sensor and a sensed quantity of the output shaft rotation sensor;

setting a target compression ratio in accordance with an engine operating condition by using a sensed quantity representing a relatively high compression ratio at a time of occurrence of the ratcheting; and controlling a driving condition of the driving unit in accordance with the target compression ratio.

* * * * *